United States Patent
Sheth et al.

(10) Patent No.: US 10,822,496 B2
(45) Date of Patent: Nov. 3, 2020

(54) ELECTRICAL TRACKING RESISTANCE COMPOSITIONS, ARTICLES FORMED THEREFROM, AND METHODS OF MANUFACTURE THEREOF

(71) Applicant: SABIC GLOBAL TECHNOLOGIES B.V., Bergen Op Zoom (NL)

(72) Inventors: Kapil Chandrakant Sheth, Evansville, IN (US); Hariharan Ramalingam, Bangalore (IN); Gaurav Mediratta, Karnataka (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/552,098

(22) PCT Filed: Feb. 22, 2016

(86) PCT No.: PCT/US2016/018870
§ 371 (c)(1),
(2) Date: Aug. 18, 2017

(87) PCT Pub. No.: WO2016/137862
PCT Pub. Date: Sep. 1, 2016

(65) Prior Publication Data
US 2018/0251634 A1    Sep. 6, 2018

Related U.S. Application Data

(60) Provisional application No. 62/119,487, filed on Feb. 23, 2015.

(51) Int. Cl.
| | |
|---|---|
| C08L 79/08 | (2006.01) |
| C08L 67/02 | (2006.01) |
| C08L 77/06 | (2006.01) |
| C08G 73/10 | (2006.01) |
| C08K 3/34 | (2006.01) |
| H01B 3/30 | (2006.01) |
| H01B 3/42 | (2006.01) |

(52) U.S. Cl.
CPC .......... *C08L 79/08* (2013.01); *C08G 73/1046* (2013.01); *C08G 73/1053* (2013.01); *C08G 73/1071* (2013.01); *C08K 3/346* (2013.01); *C08L 67/02* (2013.01); *C08L 77/06* (2013.01); *H01B 3/303* (2013.01); *H01B 3/305* (2013.01); *H01B 3/421* (2013.01); *C08L 2203/20* (2013.01)

(58) Field of Classification Search
CPC .......... C08L 67/02; C08L 77/06; C08L 79/08; C08L 2203/20; C08G 73/1046; C08G 73/1053; C08G 73/1071; H01B 3/303; H01B 3/305; H01B 3/421; C08K 3/346
See application file for complete search history.

(56) References Cited

U.S. PATENT DOCUMENTS

| | | | |
|---|---|---|---|
| 4,186,241 A * | 1/1980 | Janssen | H01B 3/305 156/51 |
| 4,433,104 A | 2/1984 | Giles, Jr. | |
| 4,636,544 A | 1/1987 | Hepp | |
| 4,824,723 A | 4/1989 | Campbell et al. | |
| 4,908,418 A | 3/1990 | Holub | |
| 5,013,817 A | 5/1991 | Ohta et al. | |
| 5,104,966 A | 4/1992 | David | |
| 5,288,843 A | 2/1994 | Tamai et al. | |
| 5,296,558 A * | 3/1994 | Hood | C08L 67/03 525/425 |
| 6,111,031 A | 8/2000 | Puyenbroek et al. | |
| 6,258,927 B1 | 7/2001 | Oka et al. | |
| 6,329,055 B1 | 12/2001 | Higashiura et al. | |
| 6,420,011 B1 * | 7/2002 | Tsunekawa | C08J 5/18 428/141 |
| 8,552,095 B1 | 10/2013 | Grcev et al. | |
| 8,784,719 B2 | 7/2014 | Lingannaiah et al. | |
| 8,980,053 B2 | 3/2015 | Krahn et al. | |
| 9,127,128 B2 | 9/2015 | Kuhlman et al. | |
| 9,315,702 B2 | 4/2016 | Kuhlman et al. | |
| 9,909,006 B2 | 3/2018 | Ramalingam et al. | |
| 2002/0086927 A1 | 7/2002 | De Schryver et al. | |
| 2003/0004280 A1 * | 1/2003 | Gallucci | C08K 7/06 525/432 |
| 2003/0064876 A1 | 4/2003 | Greiner et al. | |
| 2004/0105991 A1 | 6/2004 | Ishii et al. | |
| 2004/0157996 A1 * | 8/2004 | Gallucci | B82Y 30/00 525/132 |
| 2004/0220335 A1 | 11/2004 | Damman et al. | |
| 2004/0232598 A1 | 11/2004 | Donea et al. | |
| 2006/0058432 A1 | 3/2006 | Perego et al. | |
| 2008/0223602 A1 | 9/2008 | Gallucci et al. | |
| 2009/0068432 A1 * | 3/2009 | Gallucci | C08L 77/00 428/220 |
| 2009/0105381 A1 | 4/2009 | Kuijk et al. | |
| 2010/0159224 A1 | 6/2010 | Donovan et al. | |

(Continued)

FOREIGN PATENT DOCUMENTS

| | | |
|---|---|---|
| CN | 102382464 A | 3/2012 |
| CN | 103351618 A | 10/2013 |

(Continued)

OTHER PUBLICATIONS

Acquasanta et al., "Glow wire ignition temperature (GWIT) and comparative tracking index (CTI) of glass fibre filled engineering polymers, blends and flame retarded formulations", Polymer Degradation and Stability, vol. 96, 2011, pp. 2098-2103.

(Continued)

Primary Examiner — James C Goloboy
(74) Attorney, Agent, or Firm — Cantor Colburn LLP

(57) ABSTRACT

A composition comprises, based on the total weight of the composition, 25 wt % to 50 wt % of a polyetherimide; and 50 wt % to 75 wt % of a polyphthalamide; wherein the composition has a number of drops to tracking at 250 volts of greater than or equal to 50 drops determined according to ASTM D-3638-85.

11 Claims, No Drawings

(56) References Cited

U.S. PATENT DOCUMENTS

| | | | |
|---|---|---|---|
| 2011/0275743 A1* | 11/2011 | Ishii | C08K 5/0066 |
| | | | 524/106 |
| 2012/0029125 A1* | 2/2012 | Gallucci | C08G 73/1046 |
| | | | 524/153 |
| 2012/0083553 A1 | 4/2012 | Wakatsuka et al. | |
| 2012/0217434 A1* | 8/2012 | I'Abee | C08K 3/013 |
| | | | 252/74 |
| 2012/0248102 A1 | 10/2012 | Van De Wetering et al. | |
| 2012/0248382 A1 | 10/2012 | Van De Wetering et al. | |
| 2013/0001824 A1 | 1/2013 | Lingannaiah et al. | |
| 2013/0053489 A1 | 2/2013 | Gallucci et al. | |
| 2013/0108851 A1 | 5/2013 | Kuhlman et al. | |
| 2013/0108852 A1 | 5/2013 | Kuhlman et al. | |
| 2013/0260125 A1 | 10/2013 | Ordonez et al. | |
| 2013/0331478 A1 | 12/2013 | La Camera et al. | |
| 2013/0344313 A1 | 12/2013 | Ordonez et al. | |
| 2014/0073724 A1* | 3/2014 | Zheng | C08G 69/36 |
| | | | 524/100 |
| 2014/0334090 A1* | 11/2014 | Shen | C08L 77/02 |
| | | | 361/679.33 |
| 2015/0218366 A1 | 8/2015 | Taketani et al. | |
| 2018/0044521 A1 | 2/2018 | Sheth et al. | |
| 2018/0044522 A1 | 2/2018 | Sheth et al. | |
| 2018/0051173 A1 | 2/2018 | Sheth et al. | |
| 2019/0119449 A1 | 4/2019 | Sheth et al. | |

FOREIGN PATENT DOCUMENTS

| | | | |
|---|---|---|---|
| EP | 0407061 A1 | 1/1991 | |
| EP | 0414748 B1 | 3/1991 | |
| EP | 0323142 B1 | 9/1993 | |
| JP | 05021650 A | 1/1993 | |
| JP | 2003171552 | 6/2003 | |
| WO | 8800219 A1 | 1/1988 | |
| WO | 198900758 A1 | 1/1989 | |
| WO | 2012135446 A1 | 10/2012 | |
| WO | 2014128072 A1 | 8/2014 | |
| WO | 2017222985 A1 | 12/2017 | |

OTHER PUBLICATIONS

Acquasanta et al., "Study of Glow Wire Ignition Temperature (GWIT) and Comparative Tracking Index (CTI) performances of engineering thermoplastics and correlation with material properties", Polymer Degradation and Stability, vol. 96, 2011, pp. 566-573.

Anonymous, "Tensile Property Testing of Plastics" MatWeb: Material Property Data, XP055261935, URL: http://www.matweb.com/reference/tensilestrength.aspx. [retrieved on Mar. 31, 2016], 2 pages.

International Search Report for International Application No. PCT/US16/18870, International Filing Date Feb. 22, 2016, dated Sep. 9, 2016, 8 pages.

Sullalti et al., "Effect of phosphorus based flame retardants on UL94 and Comparative Tracking Index properties of poly(butylene terephthalate)", Polymer Degradation and Stability, vol. 97, 2012, pp. 566-572.

Written Opinion for International Application No. PCT/US16/18870, International Filing Date Feb. 22, 2016, dated Sep. 9, 2016, 13 pages.

* cited by examiner

ELECTRICAL TRACKING RESISTANCE COMPOSITIONS, ARTICLES FORMED THEREFROM, AND METHODS OF MANUFACTURE THEREOF

CROSS REFERENCE TO RELATED APPLICATIONS

This application is a National Stage application of PCT/US16/18870, filed Feb. 22, 2016, which claims the benefit of U.S. Provisional Application No. 62/119,487, filed Feb. 23, 2015, both of which are incorporated by reference in their entirety herein.

BACKGROUND

This disclosure is directed to polyetherimide compositions, and in particular to electrical tracking resistant polyetherimide compositions, articles formed therefrom, and their methods of manufacture.

Polyetherimides are known as outstanding high performance materials, having a high glass transition temperature (Tg), high modulus and strength at elevated temperatures, as well as excellent chemical resistance. They are useful in the manufacture of articles and components for a wide range of applications. Because of their broad use, particularly in the electrical and electronic industries, it is desirable to provide polyetherimides with good electrical tracking resistance. Electrical tracking is the formation of conductive pathways on the surface of a polymer under certain conditions and at a certain voltage. Electrical tracking in a polymer can be a source of fire therefore resistance to electrical tracking is often an important safety requirement for a material used in certain electrical applications. A common method of reporting the electrical tracking resistance of a polymer is by its comparative tracking index rating (CTI). Currently known polyetherimides can have a comparative tracking index (CTI) of 100 to 175 volts. However, some applications can require a material having a higher CTI.

There accordingly remains a need in the art for polyetherimide compositions that have excellent electrical tracking resistance. It would be a further advantage if the compositions could be rendered electrical tracking resistant without a significant detrimental effect on one or more of material cost, processability, and mechanical properties.

SUMMARY

The above-described and other deficiencies of the art are met by a polyetherimide composition comprising: based on the total weight of the composition, 25 wt % to 50 wt % of a polyetherimide; and 50 wt % to 75 wt % of a polyphthalamide; wherein the composition has a number of drops to tracking at 250 volts of greater than or equal to 50 drops determined according to ASTM D-3638-85.

An exemplary composition comprises, based on the total weight of the composition, 25 wt % to 60 wt % of a polyetherimide; and 40 wt % to 75 wt % of a polyester; wherein the composition has a number of drops to tracking at 250 volts of greater than or equal to 50 drops determined according to ASTM D-3638-85.

Another exemplary composition comprises, based on the total weight of the composition, 25 wt % to 75 wt % of a polyetherimide; and 25 wt % to 75 wt % of an aliphatic polyamide; wherein the composition has a number of drops to tracking at 250 volts of greater than or equal to 50 drops determined according to ASTM D-3638-85.

In another embodiment, a method of manufacture comprises combining the above-described components to form a polyetherimide composition.

In yet another embodiment, an article comprises the above-described polyetherimide composition.

In still another embodiment, a method of manufacture of an article comprises molding, extruding, or shaping the above-described polyetherimide composition into an article.

The above described and other features are exemplified by the following drawings, detailed description, examples, and claims.

DETAILED DESCRIPTION

The inventors have discovered that the addition of 25 wt % to 75 wt % of a polymer such as a polyphthalamide, a polyester, an aliphatic polyamide, or a combination comprising at least one of the foregoing to polyetherimides results in a significant improvement in the electrical tracking resistance of the polyetherimides. The polyetherimide compositions have a number of drops to tracking at 250 volts of greater than or equal to 50 drops determined according to ASTM D-3638-85 and a tracking voltage of greater than or equal to 270 volts determined according to ASTM D-3638-85. The polyetherimide compositions can further have balanced mechanical properties such as tensile strength, tensile modulus, melt flow, or heat deflection temperature.

Polyetherimides comprise more than 1, for example 2 to 1000, or 5 to 500, or 10 to 100 structural units of formula (1)

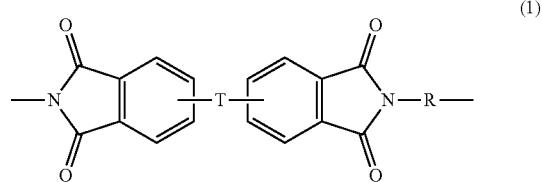

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, in particular a halogenated derivative of any of the foregoing. In some embodiments R is divalent group of one or more of the formulas (2)

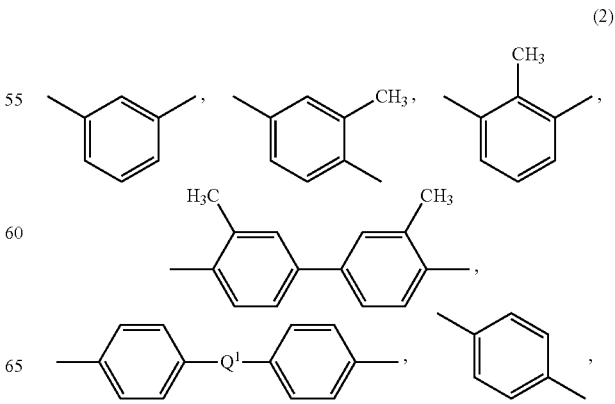

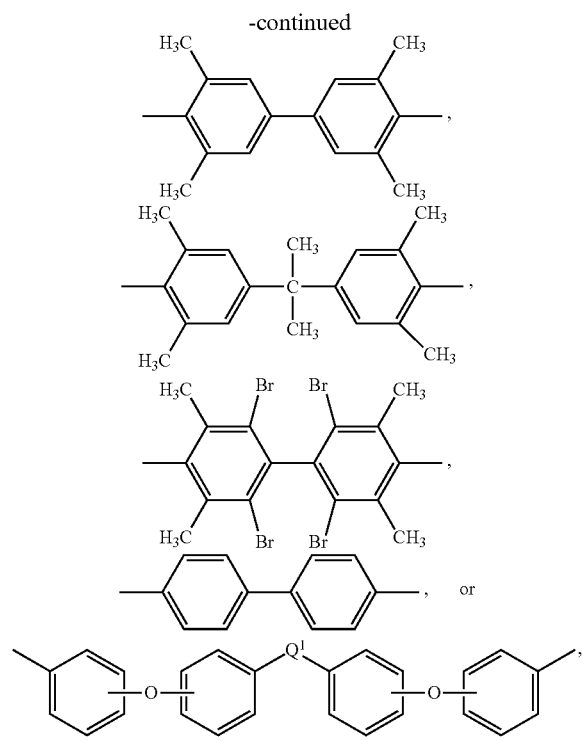

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent of the R groups contain sulfone groups, and in other embodiments no R groups contain sulfone groups.

Further in formula (1), T is —O— or a group of the formula —O—Z—O— wherein the divalent bonds of the —O— or the —O—Z—O— group are in the 3,3', 3,4', 4,3', or the 4,4' positions, and Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing, provided that the valence of Z is not exceeded. Exemplary groups Z include groups of formula (3)

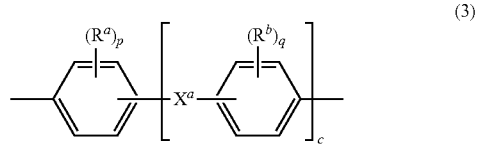

wherein R$^a$ and R$^b$ are each independently the same or different, and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (3a)

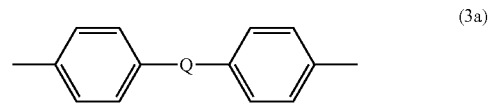

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (1), R is m-phenylene, p-phenylene, or a combination comprising at least one of the foregoing, and T is —O—Z—O— wherein Z is a divalent group of formula (3a). Alternatively, R is m-phenylene, p-phenylene, or a combination comprising at least one of the foregoing, and T is —O—Z—O wherein Z is a divalent group of formula (3a) and Q is 2,2-isopropylidene. Alternatively, the polyetherimide can be a copolymer comprising additional structural polyetherimide units of formula (1) wherein at least 50 mole percent (mol %) of the R groups are bis(3,4'-phenylene)sulfone, bis(3,3'-phenylene)sulfone, or a combination comprising at least one of the foregoing and the remaining R groups are p-phenylene, m-phenylene or a combination comprising at least one of the foregoing; and Z is 2,2-(4-phenylene)isopropylidene, i.e., a bisphenol A moiety.

In some embodiments, the polyetherimide is a copolymer that optionally comprises additional structural imide units that are not polyetherimide units, for example imide units of formula (4)

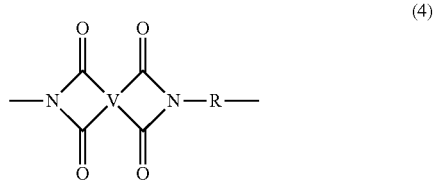

wherein R is as described in formula (1) and each V is the same or different, and is a substituted or unsubstituted C$_{6-20}$ aromatic hydrocarbon group, for example a tetravalent linker of the formulas

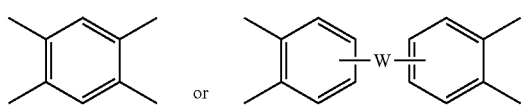

wherein W is a single bond, —S—, —C(O)—, —SO$_2$—, —SO—, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the polyetherimide.

The polyetherimide can be prepared by any of the methods known to those skilled in the art, including the reaction of an aromatic bis(ether anhydride) of formula (5) or a chemical equivalent thereof, with an organic diamine of formula (6)

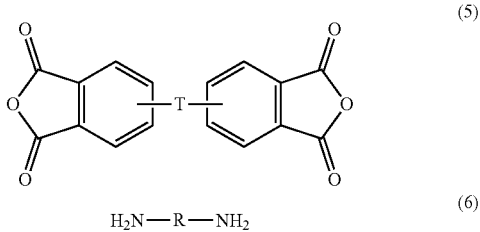

$$H_2N-R-NH_2 \quad (6)$$

wherein T and R are defined as described above. Copolymers of the polyetherimides can be manufactured using a combination of an aromatic bis(ether anhydride) of formula (5) and an additional bis(anhydride) that is not a bis(ether anhydride), for example pyromellitic dianhydride or bis(3,4-dicarboxyphenyl) sulfone dianhydride.

Illustrative examples of aromatic bis(ether anhydride)s include 2,2-bis[4-(3,4-dicarboxyphenoxy)phenyl]propane dianhydride (also known as bisphenol A dianhydride or BPADA), 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy) benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; 4,4'-(hexafluoroisopropylidene) diphthalic anhydride; and 4-(2,3-dicarboxyphenoxy)-4'-(3,4-dicarboxyphenoxy)diphenyl sulfone dianhydride. A combination of different aromatic bis(ether anhydride)s can be used.

Examples of organic diamines include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimides typically have an intrinsic viscosity greater than 0.2 deciliters per gram (dl/g), or, more specifically, 0.35 to 0.7 dl/g as measured in m-cresol at 25° C.

The amount of polyetherimide used in the polyetherimide composition can vary widely, and is that amount effective to provide the desired mechanical properties and electrical tracking resistance. In some instances the polyetherimide is present in an amount from 25 wt % to 75 wt %, 25 wt % to 60 wt %, or 25 wt % to 50 wt %, each based on the total weight of the composition.

The polyetherimide compositions further comprise a polyphthalamide. Polyphthalamides comprise repeating units having formula (7)

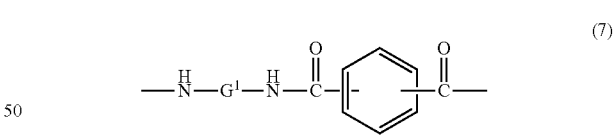

wherein each $G^1$ is independently a branched or unbranched $C_{4-8}$ alkyl. In some embodiments, each $G^1$ is a 1,6-hexyl group. Polyamides, in general characterized by the presence of an amide group (—C(O)NH—) which is the condensation product of a carboxylic acid and an amine Polyphthalamides are the condensation product of terephthalic acid and an amine, isophthalic acid and an amine or a combination of terephthalic acid, isophthalic acid and an amine. When employing more than one diamine the ratio of the diamines can affect some of the physical properties of the resulting polymer such as the melt temperature. When employing more than one acid, the ratio of the acids can affect some of the physical properties of the resulting polymer as well. The ratio of diamine to dicarboxylic acid is typically equimolar although excesses of one or the other can be used to determine the end group functionality. In addition the reaction can further include monoamines and monocarboxylic acids which function as chain stoppers and determine, at least in part, the end group functionality. In some embodiments it is preferable to have an amine end group content of greater than or equal to about 30 milllequivalents per gram (meq/g), or, more specifically, greater than or equal to about 40 meq/g.

In an embodiment the polyphthalamide is a block copolymer or a random copolymer comprising the units of formula (7) and units of formula (8)

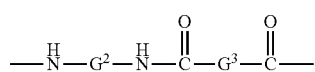   (8)

wherein each $G^2$ and $G^3$ are independently a branched or unbranched $C_{4-12}$ alkyl group.

In an embodiment, the polyetherimide compositions comprise a nylon, i.e., an aliphatic polyamide. Aliphatic polyamides comprise units of formula (8). Aliphatic polyamides are generally derived from the polymerization of the corresponding $C_{4-12}$ organic lactams, or $C_{4-12}$ amino acids and $C_{4-12}$ carboxylic acids as is known in the art. Examples of useful nylon 6, nylon 6,6, nylon 4,6, nylon 6, 12, nylon 10, or the like, or combinations including at least one of the foregoing polyamides.

The polyetherimide compositions can comprise a polyester. Suitable polyesters include those comprising structural units of the formula (9)

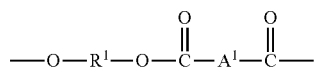   (9)

wherein each $R^1$ is independently a divalent aliphatic, alicyclic, or aromatic hydrocarbon group, or a combination comprising at least one of the foregoing and each $A^1$ is independently a divalent aliphatic, alicyclic, or aromatic group, or a combination comprising at least one of the foregoing. Examples of suitable polyesters comprising the structure of formula (9) are poly(alkylene dicarboxylate)s, liquid crystalline polyesters, polyarylates, and polyester copolymers such as copolyestercarbonates and polyesteramides. Also included are polyesters that have been treated with relatively low levels of diepoxy or multi-epoxy compounds. It is also possible to use branched polyesters in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make branched polyester. Furthermore, it is sometimes desirable to have various concentrations of acid and hydroxyl endgroups on the polyester, depending on the ultimate end-use of the composition.

In some embodiments at least some of the polyester comprises nucleophilic groups such as, for example, carboxylic acid groups. In some instances, it is desirable to reduce the number of carboxylic end groups, typically to less than 20 microequivalents per gram of polyester, with the use of acid reactive species. In other instances, it is desirable that the polyester has a relatively high carboxylic end group concentration, for example 20 to 250 microequivalents per gram of polyester or, more specifically, 30 to 100 microequivalents per gram of polyester.

In some embodiments, in formula (9) is a $C_{2-10}$ alkylene group, a $C_{6-10}$ alicyclic group or a $C_{6-20}$ aromatic group, preferably a $C_{2-6}$ or a $C_{2-4}$ alkylene group. The $A^1$ group in formula (9) is most often p- or m-phenylene or a mixture thereof. This class of polyesters includes the poly(alkylene terephthalates), the poly(alkylene naphthalates) and the polyarylates. Exemplary poly(alkylene terephthalates) include linear aliphatic polyesters such as poly(ethylene terephthalate) (PET) and poly(butylene terephthalate) (PBT), as well as cyclic aliphatic polyesters such as poly(cyclohexanedimethanol terephthalate) (PCT). Exemplary poly(alkylene naphthalate)s include poly(butylene-2,6-naphthalate) (PBN) and poly(ethylene-2,6-naphthalate) (PEN). Other useful polyesters include poly(ethylene-co-cyclohexanedimethanol terephthalate) (PETG), polytrimethylene terephthalate (PTT), poly(dimethanol-1,4-cyclohexanedicarboxylate) (PCCD), and polyxylene terephthalate (PXT). Polyesters are known in the art as illustrated by the following U.S. Pat. Nos. 2,465,319, 2,720,502, 2,727,881, 2,822,348, 3,047, 539, 3,671,487, 3,953,394, and 4,128,526.

Liquid crystalline polyesters having melting points less that 380° C. and comprising recurring units derived from aromatic diols, aliphatic or aromatic dicarboxylic acids, and aromatic hydroxy carboxylic acids are also useful. Examples of useful liquid crystalline polyesters include, but are not limited to, those described in U.S. Pat. Nos. 4,664,972 and 5,110,896. Mixtures of polyesters are also sometimes suitable.

The various polyesters can be distinguished by their corresponding glass transition temperatures (Tg) and melting points (Tm). The liquid crystalline polyesters generally have a Tg and Tm that are higher than the naphthalate-type polyesters. The naphthalate-type polyesters generally have a Tg and Tm that are higher than the terephthalate-type polyesters. Selection of the polyester or combination of polyesters utilized is therefore determined, in part, by the desired property profile required by the ultimate end-use application for the composition.

Because of the tendency of polyesters to undergo hydrolytic degradation at the high extrusion and molding temperatures in some embodiments the polyester is substantially free of water. The polyester can be predried before admixing with the other ingredients. Alternatively, the polyester can be used without predrying and the volatile materials can be removed by vacuum venting the extruder. The polyesters generally have number average molecular weights in the range of 15,000-100,000, as determined by gel permeation chromatography (GPC) at 30° C. in a 60:40 by weight mixture of phenol and 1,1,2,2-tetrachloroethane.

The polyetherimide compositions also comprise talc. The amount of talc is in the range of 5 to 20 wt %, or 5 to 15 wt %, based on the total weight of the polyetherimide compositions.

The particle size of talc also affects the CTI performance of the polyetherimide compositions. In an embodiment, the titanium dioxide has a D95 of 2 microns to 6 microns. As used herein, D95 refer to the cut-particle diameter of the particulate where 95 wt % of the particles in the total distribution of the referenced sample have the noted particle diameter or smaller. For example, a D95 particle size of 3.5 microns means that 95 wt % of the particles in the sample have a diameter of 3.5 microns or less. In an embodiment, the particle size is determined by sedigraph analysis using for example a Micromeritics Sedigraph 5120 Particle Size Analysis System.

The polyetherimide compositions can include various additives ordinarily incorporated into polymer compositions of this type, with the proviso that the additives are selected so as to not significantly adversely affect the desired properties of the composition. Exemplary additives include catalysts, impact modifiers, fillers, antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame retardants, antidrip agents, and radiation stabilizers. Combinations of additives can be used, for example a combination of a heat stabilizer, a mold release agent, and optionally an ultraviolet light stabilizer. In an embodiment the polyetherimide compositions further comprise an additive selected from a processing aid, a heat stabilizer, an ultraviolet light absorber, a colorant, a flame retardant, or a combination comprising at least one of the foregoing. In general, the additives are used in the amounts generally known to be effective. The foregoing additives (except any fillers) are generally each present in an amount of 0.0001 to 20 wt % or 0.005 to 20 wt %, specifically 0.01 to 10 wt %, based on the total weight of the composition. Alternatively, in some embodiments, the compositions do not contain appreciable amounts of additives, and in some embodiments, there are no detectable amounts of additives, i.e., additives are substantially absent or absent from the compositions. Accordingly, the foregoing additives (except any fillers) can be present in an amount from 0 to 0.1 wt %, 0 to 0.01 wt %, or 0 to 0.001 wt %, or 0 to 0.0001 wt %, based on the total weight of the composition. In another embodiment, no appreciable amount of any additive other than a heat stabilizer, a mold release agent, and optionally an ultraviolet light stabilizer is present in the compositions. In still another embodiment, no detectable amount of any additive other than a heat stabilizer, a mold release agent, and optionally an ultraviolet light stabilizer is present in the compositions.

Suitable antioxidants can be compounds such as phosphites, phosphonites, and hindered phenols or a combination comprising at least one of the foregoing. Phosphorus-containing stabilizers including triaryl phosphites and aryl phosphonates are useful additives. Difunctional phosphorus containing compounds can also be unseeded. Preferred stabilizers can have a molecular weight greater than 300. Some exemplary compounds are tris-di-tert-butylphenyl phosphite available from Ciba Chemical Co. as IRGAFOS 168 and bis (2,4-dicumylphenyl) pentaerythritol diphosphite available commercially from Dover Chemical Co. as DOVERPHOS S-9228.

Examples of phosphites and phosphonites include: triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butyl-phenyl) 4,4'-biphenylene diphosphonite, bis(2,4-di-tert-butyl-6-methylphenyl) methyl phosphite, bis(2,4-di-tert-butyl-6-methylphenyl) ethyl phosphite, 2,2',2"-nitrilo[triethyl tris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite and 5-butyl-5-ethyl-2-(2,4,6-tri-tert-butylphenoxy)-1,3,2-dioxaphosphirane.

Combinations comprising more than one organophosphorous compound are contemplated. When used in combination the organo phosphorous compounds can be of the same type or different types. For example, a combination can comprise two phosphite or a combination can comprise a phosphite and a phosphonite. In some embodiments, phosphorus-containing stabilizers with a molecular weight greater than 300 are useful. Phosphorus-containing stabilizers, for example an aryl phosphite are usually present in the composition in an amount from 0.005 to 3 wt %, specifically 0.01 to 1.0 wt %, based on total weight of the composition.

Hindered phenols can also be used as antioxidants, for example alkylated monophenols, and alkylated bisphenols or poly phenols. Exemplary alkylated monophenols include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol or a combination comprising at least one of the foregoing. Exemplary alkylidene bisphenols include 2,2'-methylenebis(6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha, alpha-dimethylbenzyl)-4-nonylphenol], 4,4'-methylenebis-(2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane or a combination comprising at least one of the foregoing.

The hindered phenol compound can have a molecular weight of greater than 300 g/mole. The high molecular weight can help retain the hindered phenol moiety in the polymer melt at high processing temperatures, for example greater than 300° C. Hindered phenol stabilizers, are usually present in the composition in an amount from 0.005 to 2 wt %, specifically 0.01 to 1.0 wt %, based on total weight of the composition.

Examples of mold release agents include both aliphatic and aromatic carboxylic acids and their alkyl esters, for example, stearic acid, behenic acid, pentaerythritol tetrastearate, glycerin tristearate, and ethylene glycol distearate. Polyolefins such as high-density polyethylene, linear low-density polyethylene, low-density polyethylene and similar polyolefin homopolymers and copolymers can also be used a mold release agents. Mold release agents are typically present in the composition at 0.05 to 10 wt %, based on total weight of the composition, specifically 0.1 to 5 wt %. Preferred mold release agents will have high molecular weight, typically greater than 300, to prevent loss of the release agent from the molten polymer mixture during melt processing.

In particular, an optional polyolefin can be added to modify the chemical resistance characteristics and mold release characteristics of the composition. Homopolymers such as polyethylene, polypropylene, polybutene can be used either separately or in combination. Polyethylene can be added as high-density polyethylene (HDPE), low-density polyethylene (LDPE) or branched polyethylene. Polyolefins can also be used in copolymeric form with compounds containing carbonic acid groups such as maleic acid or citric acid or their anhydrides, acid compounds containing acrylic acid groups such as acrylic acid ester, and the like, as well as combinations comprising at least one of the foregoing. When present, the polyolefin, in particular HDPET, is used in an amount from more than 0 to 10 wt %, specifically 0.1 to 8 wt %, more specifically from 0.5 to 5 wt %, all based on the total weight of the composition.

In some embodiments, the polyetherimide compositions can further include at least one additional polymer. Examples of such additional polymers include and are not limited to PPSU (polyphenylene sulfone), polyetherimides, PSU (polysulfone), PPET (polyphenylene ether), PFA (perfluoroalkoxy alkane), MFA (co-polymer of TFE tetrafluoroethylene and PFVE perfluorinated vinyl ether), FEP (fluorinated ethylene propylene polymers), PPS (poly(phenylene sulfide), PTFE (polytetrafluoroethylene), PA (polyamide), PBI (polybenzimidizole) and PAI (poly(amide-imide)), poly (ether sulfone), poly(aryl sulfone), polyphenylenes, polybenzoxazoles, polybenzthiazoles, as well as blends and co-polymers thereof. When present, the polymer is used in an amount from more than 0 to 20 wt %, specifically 0.1 to 15 wt %, more specifically from 0.5 to 10 wt %, all based on the total weight of the composition. In an embodiment, no polymer other than the polyetherimide as described herein is present in the composition.

Colorants such as pigment and/or dye additives can also optionally be present. Useful pigments can include, for example, inorganic pigments such as metal oxides and mixed metal oxides such as zinc oxide, titanium dioxide, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amount from 0 to 10 wt %, specifically 0 to 5 wt %, based on the total weight of the composition. In some instances, where improved impact is desired pigments such as titanium dioxide will have a mean particle size of less than 5 microns.

In some instances it is desired to have polyetherimide compositions that are essentially free of bromine and chlorine. "Essentially free" of bromine and chlorine means that the composition has less than 3 wt % of bromine and chlorine, and in other embodiments less than 1 wt % bromine and chlorine by weight of the composition. In other embodiments, the composition is halogen free. "Halogen free" is defined as having a halogen content (total amount of fluorine, bromine, chlorine, and iodine) of less than 1000 parts by weight of halogen per million parts by weight of the total composition (ppm). The amount of halogen can be determined by ordinary chemical analysis such as atomic absorption.

The polyetherimide compositions can be prepared by blending the ingredients under conditions for the formation of an intimate blend. Such conditions often include melt mixing in single or twin screw type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the PET and polyimide polymers prior to melting. The melt processing is often done at 290 to 340° C. to avoid excessive polymer degradation while still allowing sufficient melting to get an intimate polymer mixture free of any unbelted components. The polymer blend can also be melt filtered using a 40 to 100 micron candle or screen filter to remove undesirable black specks or other heterogeneous contaminants.

In an exemplary process, the various components are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained. The polyetherimide compositions can then be molded in any equipment conventionally used for polyetherimide compositions, such as a Newbury or van Dorn type injection-molding machine with conventional cylinder temperatures, at 250° C. to 320° C., and conventional mold temperatures at 55° C. to 120° C.

As discussed above, the polyetherimide compositions are formulated to have excellent electrical tracking resistance. In an embodiment, the compositions have number of drops to tracking at 250 volts greater than or equal to 50 drops determined according to ASTM D-3638-85.

Shaped, formed, or molded articles comprising the polyetherimide compositions are also provided. The polyetherimide compositions can be molded into useful shaped articles by a variety of means such as injection molding, extrusion, rotational molding, blow molding, and thermoforming. Thus the polyetherimide compositions can be used to form a foamed article, a molded article, a thermoformed article, an extruded film, an extruded sheet, one or more layers of a multi-layer article (e.g. a cap-layer), a substrate for a coated article, or a substrate for a metallized article.

In another embodiment, at least one of the following articles are contained in or are derived from the compositions encompassed by this disclosure: a solar apparatus, an electrical junction box, an electrical connector, an electrical vehicle charger, an outdoor electrical enclosure, a smart meter enclosure, a smart grid power node, PV (photovoltaic) frame, and miniature circuit breaker (MCB) applications.

The polyetherimide compositions having improved CTI performance and balanced mechanical properties are further illustrated by the following non-limiting examples. All parts and percentages are by weight unless explicitly stated otherwise. All temperatures are degrees Celsius unless explicitly stated otherwise.

EXAMPLES

The materials used in the Examples are described in Table 1.

TABLE 1

| Component | Chemical Description | Source, Vendor |
|---|---|---|
| PEI | Polyetherimide (ULTEM*) | SABIC |
| PBT | Polybutylene terephthalate (PBT 315) | SABIC |
| PPA | Polyphthalamides (ZYTEL* HTN 501) | DuPont |
| Nylon 6,6 | Poly[imino(1,6-dioxohexamethylene) imnohexamethylene] (ZYTEL* PA66) | DuPont |
| Jetfine Talc 3CA | Talc having a D95 of 3.5 microns | IMERYS |

Blending, Extrusion, and Molding Conditions

Compositions were formed by melt mixing the polyetherimide and PPA or Nylon 6,6. Extrusion was carried out in a 2.5-inch twin screw, vacuum vented extruder. The extruder was set at about 300-350° C. The blends were run at approximately 250 rotations per minute (rpm) under vacuum. Compositions were made in a one pass method. The extrudate was cooled, pelletized, and dried at 150° C. Test samples were injection molded at a set temperature of 340-350° C. and mold temperature of 150-160° C. using a 30 second cycle time.

Testing Procedures

All molded samples were conditioned for at least 48 hours at 50% relative humidity prior to testing. Properties were measured using ASTM test methods. Unless specified to the contrary herein, all test standards are the most recent standard in effect at the time of filing this application.

Notched Izod impact values were measured at room temperature on 3.2 millimeter thick bars as per ASTM D256. Bars were notched prior to oven aging; samples were tested at room temperature. Results are in Joules per meter (J/m).

Tensile properties were measured on 3.2 millimeter type I bars as per ASTM method D638 at 23° C. with a crosshead speed of 5 millimeters/minute. Percent elongation (% Elongation) is reported at break (B). Tensile modulus, tensile strength at yield, tensile strength at break results is reported in MPa (Mega Pascal) or GPa (Giga Pascal).

Melt flow rates (MFR) were measured in accordance with ASTM D1238 at 337° C., using a 6.7 kilogram (kg) weight. MFR is reported in grams per 10 minutes (g/10 min).

Heat Deflection Temperature (HDT) was measured on 3.2 millimeter injection molded bar at 1.82 MPa stress according to ASTM D648. HDT is reported in degree Celsius (C).

Electrical tracking resistance tests were performed on a 3 mm square plaque (6×6 cm) in accordance with the ASTM D-3638. The test can be started at any given voltage. At each voltage 5 specimens are tested and the average number of drops is recorded. The test is performed at (at least) 4 different voltages, where there should be at least two data points with an average number of drops higher than 50 and two data points with an average number of drops lower than 50. A voltage extrapolation to 50 drops is made, and based on this voltage ($V_{ASTM}$) a PLC class is assigned. This assignment is provided according to the table below. The CTI rating of a polymer indicates how resistant the polymeric material is to electrical tracking at certain voltages. CTI ratings range from CTI-0 to CTI-5 with a CTI-1 rating indicating that a polymer is more resistant to electrical tracking than a polymer with a lower CTI rating (for example CTI-3).

| VASTM | PLC |
|---|---|
| <100 | 5 |
| 100-174 | 4 |
| 175-249 | 3 |
| 250-399 | 2 |
| 400-599 | 1 |
| ≥600 | 0 |

A screening method was employed to predict the CTI-2 performance of polyetherimide compositions. The method employed the ASTM D-3638 method but testing was conducted at only one voltage, 250 V. The number of drops until failure was recorded and no more than 100 drops were applied. A prediction of a CTI-2 rating for a sample was based on reaching at least 50 drops of the electrolyte solution before failure at 250 V. A prediction of not receiving a CTI rating was based on failure before reaching 50 drops of the electrolyte solution at 250 V. The screening method for predicting CTI-2 rating is identified throughout the disclosure as the CTI test.

Examples 1-4

Examples 1-4 demonstrate the effect of the addition of various amounts of PPA in the polyetherimide compositions on mechanical and CTI properties. Formulations and results are shown in table 2.

TABLE 2

| | 1 | 2 | 3* | 4* |
|---|---|---|---|---|
| Component | | | | |
| PEI | 25 | 40 | 60 | 75 |
| PPA | 75 | 60 | 40 | 25 |
| Property | | | | |
| Tensile strength (MPa) | 70 | 72 | 88 | 71 |
| Tensile modulus (GPa) | 2982 | 3031 | 3128 | 3090 |
| % Elongation | 3 | 3 | 5 | 28 |
| Flexural strength (GPa) | 123 | 131 | 149 | 155 |
| Flexural Modulus (MPa) | 2962 | 2958 | 3186 | 3203 |
| MFR 337° C., 6.7 Kg, 5 min (g/10 min) | — | 52.4 | 23.7 | 5.6 |
| Notched Impact (J/m) | 52 | 50 | 44 | 44 |
| HDT (1.82 MPa) | 115 | 114 | 134 | 169 |
| No. of drops for tracking@ 250 Volts | 100 | 100 | 31 | 19 |
| PLC rating | 2 | 2 | 3 | 3 |

*Comparative Example

These examples demonstrate that blending greater than 50 wt % to less than or equal to 75 wt % of PPA with PEI provides a composition capable of achieving a combination of a tensile strength greater than or equal to 70 MPa, tensile modulus greater than equal to 2900 GPa, melt flow rate greater than or equal to 50 g/10 minutes, HDT greater than or equal to 110° C., number of drops to tracking at 250 volts greater than or equal to 50 drops, and notched Izod impact strength greater than or equal to 45 J/m.

Examples 5-10

Examples 5-10 demonstrate the effect of the addition of different amounts of Nylon 6,6 in polyetherimide compositions on mechanical and CTI properties. Formulations and results are shown in Table 3.

TABLE 3

|  | 5 | 6 | 7 | 8* | 9 | 10 |
|---|---|---|---|---|---|---|
| Component |  |  |  |  |  |  |
| PEI | 25 | 40 | 60 | 75 | 50 | 47 |
| Nylon 6,6 | 75 | 60 | 40 | 25 | 33 | 53 |
| Jet fine Talc 3 CA |  |  |  |  | 17 | 15 |
| Property |  |  |  |  |  |  |
| Tensile strength (MPa) | 72 | 80 | 79 | 94 | 79 | 71 |
| Tensile modulus (GPa) | 3018 | 2923 | 2979 | 3040 | 4127 | 4438 |
| % Elongation | 4 | 7 | 4 | 6 | 4 | 4 |
| Flexural strength (GPa) | 107 | 117 | 124 | 141 | 139 | 128 |
| Flexural Modulus (MPa) | 2582 | 2763 | 2840 | 2974 | 4161 | 4534 |
| MFR 337° C., 6.7 Kg, 5 min (g/10 min) | 20 | 13 | 11 | 6 | 8 | 3 |
| HDT (1.82 MPa) | 75 | 108 | 152 | 174 | 170 | 164 |
| No. of drops for tracking@ 250 Volts | 100 | 100 | 100 | 13 | 100 | 93 |

*Comparative Example

These examples demonstrate that blending greater than 25 wt % to less than or equal to 75 wt % of Nylon 6,6 with PEI provides a composition capable of achieving a combination of a tensile strength greater than or equal to 70 MPa, tensile modulus greater than equal to 2900 GPa, melt flow rate greater than or equal to 3 g/10 minutes, HDT greater than or equal to 75° C., and number of drops to tracking at 250 volts greater than or equal to 50 drops. The data shows that addition of talc improves the heat properties of the composition (example 9) as shown by HDT data (170° C.).

Examples 11-14

Examples 11-14 demonstrate the effect of the addition of various amounts of PBT to polyetherimide compositions on tensile strength, tensile modulus, and CTI properties. Formulations and results are shown in table 4.

TABLE 4

|  | 11 | 12 | 13 | 14* |
|---|---|---|---|---|
| Component |  |  |  |  |
| PEI | 25 | 40 | 60 | 75 |
| PBT | 75 | 60 | 40 | 25 |
| Jet fine Talc 3CA |  |  |  |  |
| Property |  |  |  |  |
| Tensile strength (MPa) | 59 | 70 | 50 | 101 |
| Tensile modulus (GPa) | 2689 | 2546 | 2968 | 3075 |
| % Elongation | 3 | 37 | 2 | 4 |
| Flexural strength (GPa) | 90 | 98 | 74 | 141 |
| Flexural Modulus (MPa) | 2362 | 2324 | 2683 | 2987 |
| MFR 337° C., 6.7 Kg, 5 min (g/10 min) | 215 | 21 | 11.2 | 3.5 |
| HDT (1.82 MPa) | 72 | 65 | 92 | 119 |
| No. of drops for tracking@ 250 Volts | 69 | 100 | 100 | 5 |

*Comparative Example

These examples demonstrate that blending greater than or equal to 40 wt % to less than 75 wt % of PET with PEI provides a composition capable of achieving a combination of a tensile strength greater than or equal to 50 MPa, tensile modulus greater than equal to 2500 GPa, melt flow rate greater than or equal to 10 g/10 minutes, HDT greater than or equal to 60° C., and number of drops to tracking at 250 volts greater than or equal to 50 drops.

Set forth below are specific embodiments of polyetherimide compositions, methods of manufacture and articles comprising the same.

In an embodiment, a composition comprises, based on the total weight of the composition, 25 wt % to 50 wt % of a polyetherimide; and 50 wt % to 75 wt % of a polyphthalamide; wherein the composition has a number of drops to tracking at 250 volts of greater than or equal to 50 drops determined according to ASTM D-3638-85. One or more of the following conditions can apply: the polyphthalamide comprises units of the formula (7) wherein $Q^1$ is independently at each occurrence a branched or unbranched alicyclic alkyl group having 4 to 8 carbons, preferably $Q^1$ is independently at each occurrence a 1,6-hexyl group; the composition has a tensile strength greater than or equal to 60 MPa determined according to ASTM D638, a tensile modulus greater than equal to 2500 GPa determined according to ASTM D638, and notched Izod impact strength greater than or equal to 45 J/m measured at room temperature on 3.2 millimeter thick bars as per ASTM D256; or the composition has heat defection temperature of greater than or equal to 110° C. measured on 3.2 millimeter injection molded bar at 1.82 MPa stress according to ASTM D648.

An exemplary composition comprises, based on the total weight of the composition, 25 wt % to 60 wt % of a polyetherimide; and 40 wt % to 75 wt % of a polyester; wherein the composition has a number of drops to tracking at 250 volts of greater than or equal to 50 drops determined according to ASTM D-3638-85. One or more of the following conditions can apply: the polyester is a linear aliphatic polyester; the polyester comprises poly(ethylene terephthalate) and poly(butylene terephthalate), or a combination comprising at least one of the foregoing; the composition has a tensile strength greater than or equal to 40 MPa determined according to ASTM D638, a tensile modulus greater than equal to 2200 GPa determined according to ASTM D638; or the composition has a heat deflection temperature greater than or equal to 50° C. measured on 3.2 millimeter injection molded bar at 1.82 MPa stress according to ASTM D648.

Another exemplary composition comprises, based on the total weight of the composition, 25 wt % to 75 wt % of a polyetherimide; and 25 wt % to 75 wt % of an aliphatic polyamide; wherein the composition has a number of drops to tracking at 250 volts of greater than or equal to 50 drops determined according to ASTM D-3638-85. One or more of the following conditions can apply: the aliphatic polyamide comprises units of the formula (8) wherein each $G^2$ and $G^3$ is independently a branched or unbranched $C_{4-12}$ alkyl group; the composition has a tensile strength greater than or equal to 60 MPa determined according to ASTM D638, a tensile modulus greater than equal to 2500 GPa determined according to ASTM D638; or the composition has heat deflection temperature greater than or equal to 65° C. measured on 3.2 millimeter injection molded bar at 1.82 MPa stress according to ASTM D648.

For any of the foregoing embodiments, the polyetherimide comprises units of the formula (1) wherein R is the same or different, and is a substituted or unsubstituted divalent organic group, T is —O— or a group of the formula —O—Z—O— wherein the divalent bonds of the —O— or the —O—Z—O— group are in the 3,3', 3,4', 4,3', or the 4,4' positions; and wherein Z is an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded, preferably R is a divalent group of the formula (2) wherein $Q^1$ is —O—, —S—, —C(O)—, —SO$_2$—, —SO—, —$C_yH_{2y}$— wherein y is an integer from 1 to 5 or a halogenated derivative thereof, or —$(C_6H_{10})_z$— wherein z is an integer from 1 to 4, and Z is a divalent group of the formula (3a) wherein Q is —O—, —S—, —C(O)—, —SO$_2$—, —SO—, or —$C_yH_{2y}$— wherein y is an integer from 1 to 5 or a halogenated derivative thereof, more preferably R is m-phenylene and Q is isopropylidene.

Optionally the foregoing compositions further comprises 5 wt % to 20 wt % of talc.

In an embodiment, an insulating material comprises the composition of any one of the foregoing embodiments.

Also disclosed is an article selected from a molded article, a thermoformed article, an extruded film, an extruded sheet, one or more layers of a multi-layer article, a substrate for a coated article, and a substrate for a metallized article made from the composition of any one of the foregoing embodiments.

A method of manufacture of an article comprises molding, extruding, or casting the composition of any one of the foregoing embodiments to form the article.

A method of controlling the tracking of an electrical current of an article of manufacture comprises providing a composition of any one of the foregoing embodiments and processing the composition to form an article of manufacture.

For any of the foregoing articles or methods, the article is a solar apparatus, an electrical junction box, an electrical connector, an electrical vehicle charger, an outdoor electrical enclosure, a smart meter enclosure, a smart grid power node, a photovoltaic frame and a miniature circuit breaker.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" includes branched or straight chain, unsaturated aliphatic $C_{1-30}$ hydrocarbon groups e.g., methyl, ethyl, n-propyl, i-propyl, n-butyl, s-butyl, t-butyl, n-pentyl, s-pentyl, n- and s-hexyl, n- and s-heptyl, and, n- and s-octyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated divalent aliphatic hydrocarbon group (e.g., methylene (—CH$_2$—) or, propylene (—(CH$_2$)$_3$—)). "Cycloalkylene" means a divalent cyclic alkylene group, —$C_nH_{2n-x}$, wherein x represents the number of hydrogens replaced by cyclization(s). The term "aryl" means an aromatic hydrocarbon group containing the specified number of carbon atoms, such as to phenyl, tropone, indanyl, or naphthyl. The prefix "hetero" means that the compound or group includes at least one ring member that is a heteroatom (e.g., 1, 2, or 3 heteroatom(s)), wherein the heteroatom(s) is each independently N, O, S, or P.

"Substituted" means that the compound or group is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl (CH$_3$C$_6$H$_4$SO$_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A composition comprising, based on the total weight of the composition, 25 wt % to 40 wt % of a polyetherimide; and 60 wt % to 75 wt % of a polyphthalamide;

wherein the composition has a number of drops to tracking at 250 volts of greater than or equal to 50 drops determined according to ASTM D-3638-85, and the polyphthalamide comprises units of the formula

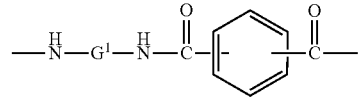

wherein each $G^1$ is a C6 alkylene group, and wherein the polyetherimide comprises units of the formula

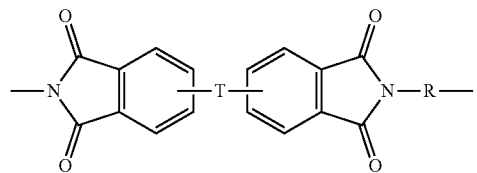

R is m-phenylene, and T is —O—Z—O— wherein Z is a divalent group of formula

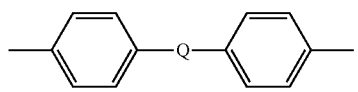

and Q is 2,2-isopropylidene, and the composition is free of aliphatic polyamides.

2. The composition of claim 1, wherein the composition has a tensile strength greater than or equal to 60 MPa determined according to ASTM D638, a tensile modulus greater than equal to 2500 GPa determined according to ASTM D638, and notched Izod impact strength greater than or equal to 45 Jim measured at room temperature on 3.2 millimeter thick bars as per ASTM D256.

3. The composition of claim 1, wherein the composition has heat defection temperature of greater than or equal to 110° C. measured on 3.2 millimeter injection molded bar at 1.82 MPa stress according to ASTM D648.

4. The composition of claim 1, further comprising 5 wt % to 20 wt % of talc.

5. An insulating material comprising the composition of claim 1.

6. An article selected from a molded article, a thermoformed article, an extruded film, an extruded sheet, one or more layers of a multi-layer article, a substrate for a coated article, and a substrate for a metallized article made from the composition of claim 1.

7. An article made from the composition of claim 1, wherein the article is a solar apparatus, an electrical junction box, an electrical connector, an electrical vehicle charger, an outdoor electrical enclosure, a smart meter enclosure, a smart grid power node, a photovoltaic frame and a miniature circuit breaker.

8. A method of manufacture of an article, comprising molding, extruding, or casting the composition of claim 1 to form the article.

9. A method of controlling the tracking of an electrical current of an article of manufacture, the method comprising: providing a composition of claim 1, and processing the composition to form an article of manufacture.

10. The method of claim 9, wherein the article is a solar apparatus, an electrical junction box, an electrical connector, an electrical vehicle charger, an outdoor electrical enclosure, a smart meter enclosure, a smart grid power node, a photovoltaic frame and a miniature circuit breaker.

11. The composition of claim 1 consisting essentially of the polyetherimide; and the polyphthalamide.

* * * * *